(12) United States Patent
Kimura

(10) Patent No.: US 11,809,764 B2
(45) Date of Patent: Nov. 7, 2023

(54) INFORMATION PROCESSING DEVICE HAVING REPORTING FUNCTION FOR DEVICE SETTINGS, METHOD OF CONTROLLING INFORMATION PROCESSING DEVICE, AND RECORDING MEDIUM

(71) Applicant: CANON KABUSHIKI KAISHA, Tokyo (JP)

(72) Inventor: Tomohiro Kimura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/854,553

(22) Filed: Jun. 30, 2022

(65) Prior Publication Data
US 2023/0035492 A1     Feb. 2, 2023

(30) Foreign Application Priority Data
Jul. 27, 2021   (JP) ................................ 2021-122336

(51) Int. Cl.
*G06F 3/12*     (2006.01)

(52) U.S. Cl.
CPC ............ *G06F 3/1231* (2013.01); *G06F 3/121* (2013.01)

(58) Field of Classification Search
CPC ... G06F 3/1231; G06F 3/1236; G06F 11/3065
USPC ............................................ 358/1.15; 399/10
See application file for complete search history.

(56) References Cited

U.S. PATENT DOCUMENTS

| | | | |
|---|---|---|---|
| 6,279,037 B1 * | 8/2001 | Tams ...................... | H04L 43/12 709/224 |
| 11,108,867 B2 | 8/2021 | Funahara | |
| 2002/0032761 A1 * | 3/2002 | Aoyagi ................... | H04L 41/12 709/219 |

FOREIGN PATENT DOCUMENTS

JP          2019062495 A       4/2019

* cited by examiner

*Primary Examiner* — Jamares Q Washington
(74) *Attorney, Agent, or Firm* — ROSSI, KIMMS & McDOWELL LLP

(57) ABSTRACT

To improve an output function of an information processing device, the information processing device includes a first acquisition control unit configured to acquire first setting information which is setting information of the own device; a communication unit configured to communicate with a relay device via a network; a second acquisition control unit configured to acquire second setting information which is setting information of the relay device via the network; a generation unit configured to generate report data by merging the first setting information and the second setting information; and an output unit configured to output the report data.

8 Claims, 10 Drawing Sheets

INFORMATION PROCESSING DEVICE HAVING REPORTING FUNCTION FOR DEVICE SETTINGS, METHOD OF CONTROLLING INFORMATION PROCESSING DEVICE, AND RECORDING MEDIUM

BACKGROUND

Field

The present invention relates to an information processing device, a method of controlling the information processing device, and a recording medium.

Description of the Related Art

When information processing devices such as image forming devices are connected to external networks, the information processing devices have a form in which they are connected to relay devices typified by mobile routers to use public communication lines. For example, in Japanese Unexamined Patent Publication No. 2019-62495, information processing devices on different networks relay cell phone lines to achieve and control end-to-end communication.

In general, image forming devices have reporting functions for device settings as structures for listing device installation information during operations. When operational problems or the like arise in image forming devices, administrators or service people (hereinafter referred to as "workers") of the image forming devices perform maintenance work based on information output with report functions. For example, when problems that services for using networks with image forming devices cannot be used arise, workers can output lists of network settings of IP addresses, gateway addresses, and the like of the image forming devices as reports on UIs or on paper media. The workers perform work for identifying causes based on the output information. The workers also add report information as necessary and inquire of image forming device vendors.

Incidentally, when problems arise in communication functions of image forming devices, it is desirable to aggregate information necessary to identify the problems from a perspective of maintenance work efficiency. Accordingly, in cases in which image forming devices use relay devices such as mobile routers for communication, convenience is improved when network information of the relay devices or the like can also be comprehensively output.

In general, however, device information of image forming devices is managed with controller platforms or the like of the image forming devices and information regarding the relay devices is managed on the relay devices. Accordingly, to comprehensively check and output information regarding communication functions, it is necessary for users performing maintenance to access each device and collect information, which results in time consumption.

As described above, in the related art, there is room for improvement in output functions of information processing devices.

SUMMARY

The information processing device of one embodiment of the invention is at least one processor or circuit configured to function as: a first acquisition control unit configured to acquire first setting information which is setting information of the own device; a communication unit configured to communicate with a relay device via a network; a second acquisition control unit configured to acquire second setting information which is setting information of the relay device via the network; a generation unit configured to generate report data by merging the first setting information and the second setting information; and an output unit configured to output the report data.

Further features of the present disclosure will become apparent from the following description of the embodiments with reference to the attached drawings.

DESCRIPTION OF THE EMBODIMENTS

Hereinafter, with reference to the accompanying drawings, favorable modes of the present disclosure will be described using embodiments. In each diagram, the same reference signs are applied to the same members or elements, and duplicate description will be omitted or simplified.

The following embodiments are not intended to limit the invention of the claims, and not all combinations of features described in the embodiments are essential to the invention.

According to the following embodiment, a structure providing a service for outputting information regarding an independent device such as a relay device and information regarding an image forming device collectively as reports will be described. Incidentally, as a control application of an image forming device, an expansion program which can be added in an add-on form independently from controller firmware which is a basic control function of a product is conceivable. As an extension program, a system which can be added on to an image forming device and through which a vendor can extend a function of the image forming device is conceivable.

When the above-described service for outputting information is provided and a service module that handles information regarding a relay device is mounted on controller firmware of an image forming device, dependence between the image forming device and the relay device becomes close. Here, in general, a product life cycle is different between the image forming device and the relay device, and the number of combinations is not singular but plural. For example, a combination of a new relay device and an image forming device may arise due to discontinuation of sales of the relay device. In the mounting in which the dependence is close, a comprehensive test for checking whether correction of controller firmware does not affect the other functions is necessary whenever a new combination arises. This may result in an increase in maintenance cost or development cost for an image forming device vendor. In view of such circumstances, embodiments provide, for example, a function of collectively outputting settings of an image forming device and a relay device while keeping dependence between the image forming device and the relay device sparse by using an extension program of the image forming device.

First Embodiment

Figure 1:
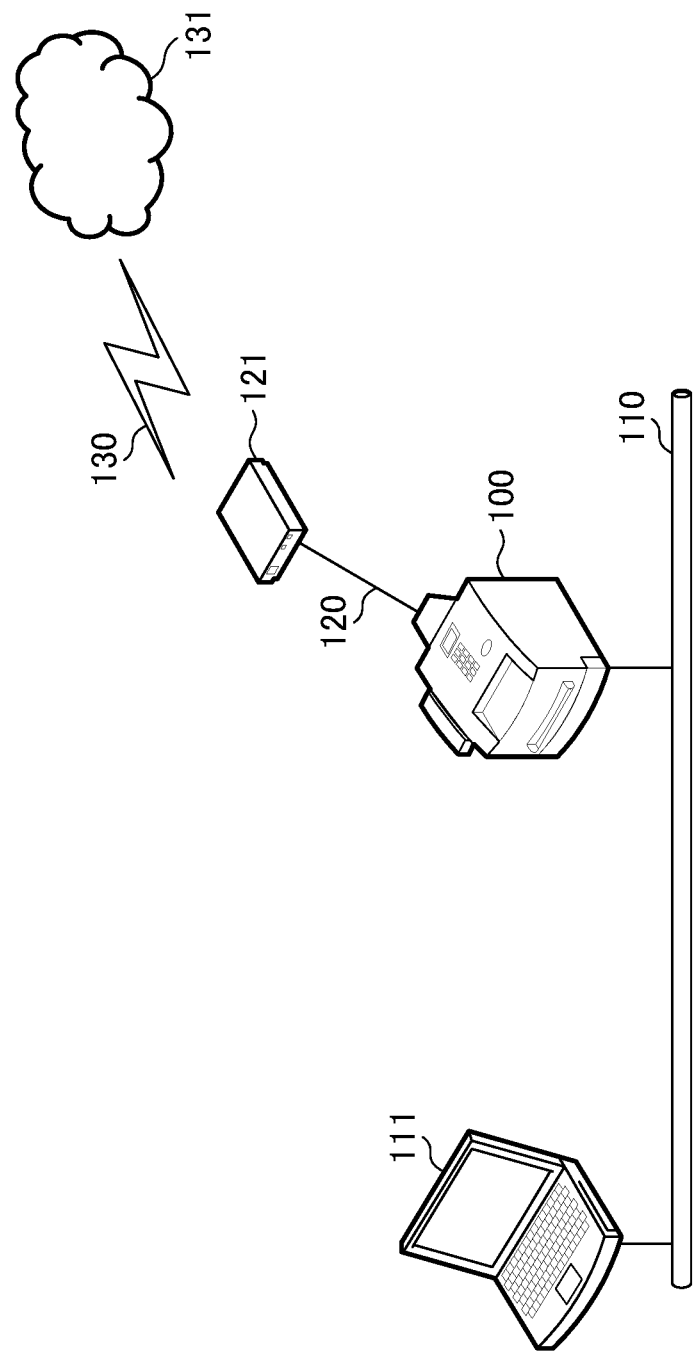
FIG. 1 is a diagram illustrating an exemplary device configuration of a management system including an image forming device according to a first embodiment.

Overall System Configuration FIG. 1 is a diagram illustrating an exemplary device configuration of a management system including an image forming device according to a first embodiment.

The image forming device 100 is an example of an information processing device according to the invention. The image forming device 100 is an example of an image processing device. The image forming device 100 is, for example, a multi-function printer (MFP) in which a plurality of functions such as a scanner, a printer, a facsimile, and a file transmission function are integrated into a copying machine. In the embodiment, the image forming device 100 will be described as a multifunctional peripheral, but the invention can also be applied to an image processing device that has a single function such as a scanner, a printer, or a facsimile, but it can also be applied to other information processing devices.

The image forming device 100 includes a network I/F. "I/F" is an abbreviation for "interface." The network I/F may be capable of communicating with any type of network, including wired and wireless networks. In the embodiment, it is assumed that two wired local area network (LANs) are used. The image forming device 100 is connected to various communication devices such as a client computer 111 and a mobile router 121 by using the network I/F via a LAN 110 and a LAN 120.

In the embodiment, a configuration in which the image forming device 100 has two network I/Fs will be exemplified, but the invention is not limited thereto. Therefore, the number of network I/Fs of the image forming device 100 may be one, or three or more.

The client computer 111 is a so-called personal computer belonging to the LAN 110. The client computer 111 communicates with the image forming device 100 on the LAN 110, so that an operation of instructing the image forming device 100 to perform printing or an operation of acquiring data scanned by the image forming device 100 can be performed.

The mobile router 121 is a so-called router device. The mobile router 121 is an example of a relay device. The mobile router 121 relays the LAN 110 and mobile telephone line 130, so that the image forming device 100 can communicate with the Internet 131.

Hardware Configuration

Image Forming Device

Figure 2:
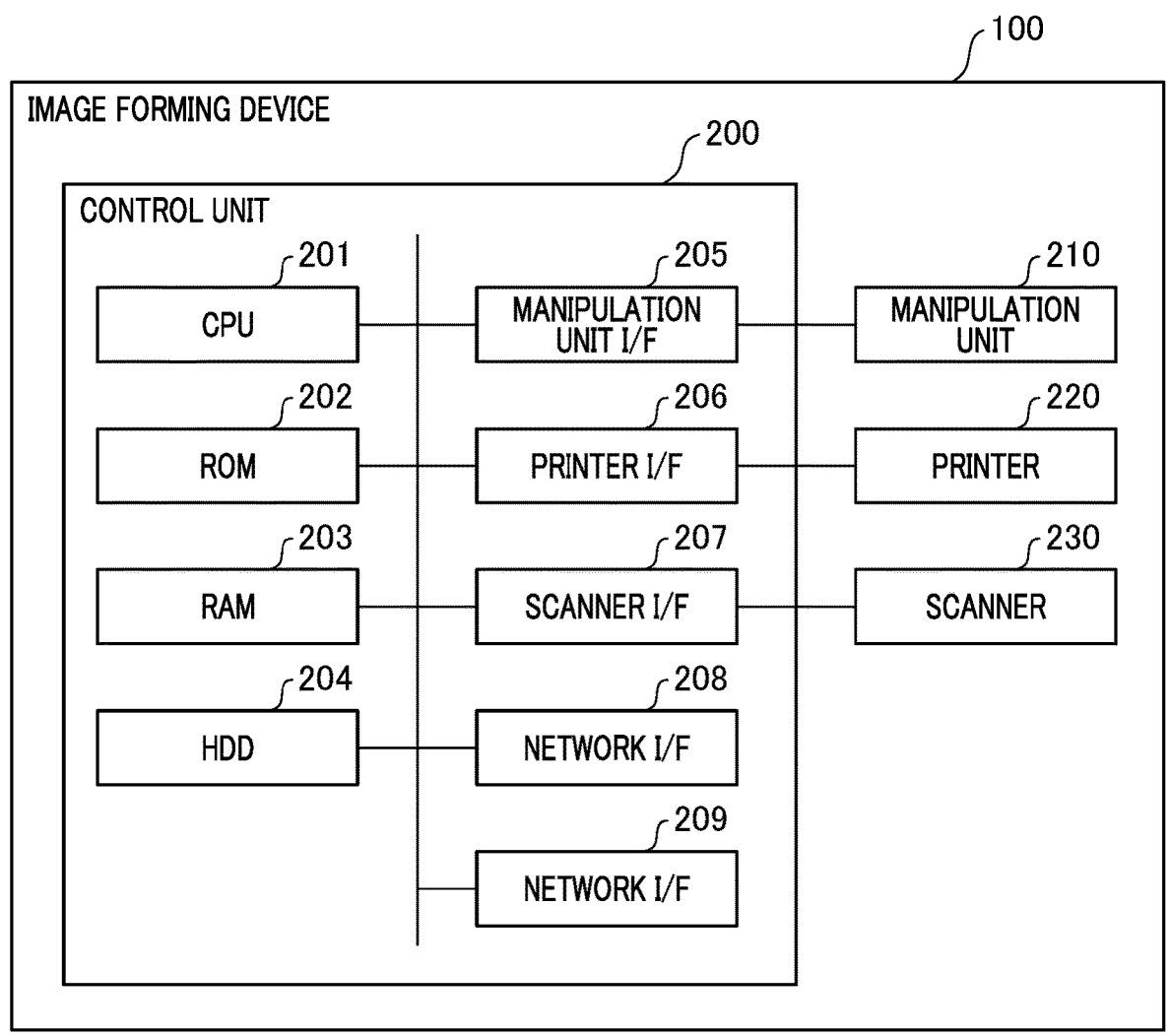
FIG. 2 is a block diagram illustrating an exemplary hardware configuration of the image forming device.

FIG. 2 is a block diagram illustrating an exemplary hardware configuration of the image forming device 100. The image forming device 100 has a control unit 200, a manipulation unit 210, a printer 220, and a scanner 230.

The control unit 200 includes a CPU 201, a ROM 202, a RAM 203, an HDD 204, a manipulation unit I/F 205, a printer I/F 206, a scanner I/F 207, a network I/F 208, and a network I/F 209. "CPU" is an abbreviation for "central processing unit." "RAM" is an abbreviation for "random access memory." "ROM" is an abbreviation for "read-only memory." "HDD" is an abbreviation for "hard disk drive."

The control unit 200 controls operations of the whole image forming device 100. The CPU 201 performs various types of control on the image forming device 100, such as reading control and transmission control by reading a control program stored in the ROM 202. The RAM 203 is used as a temporary storage area such as a main memory, a working area, and the like of the CPU 201. The HDD 204 is a hard disk drive that stores image data, various programs, and various information tables. The control unit 200 may include another storage device such as a solid-state drive (SSD).

The manipulation unit IF 205 connects the manipulation unit 210 to the control unit 200. The manipulation unit 210 includes an LCD display unit with a touch panel function and a keyboard.

The printer I/F 206 connects the printer 220 to the control unit 200. Image data to be printed by the printer 220 is transmitted from the control unit 200 to the printer 220 via the printer I/F 206. The printer 220 prints the image data (a printing image) transmitted from the control unit 200 on a recording medium such as a sheet. The sheet on which the printing image is printed is output to a discharge tray (not illustrated). In this way, the printer 220 functions as a printing unit that prints the printing image on the sheet.

The scanner I/F 207 connects the scanner 230 to the control unit 200. The scanner 230 reads an image on a document, generates image data, and inputs the image data to the control unit 200 via the scanner I/F 207.

The network I/F 208 connects the control unit 200 to the LAN 110. That is, the network I/F 208 connects the image forming device 100 to the LAN 110. The network I/F 208 transmits image data and information to external devices on the LAN 110 or receives various kinds of information from external devices on the LAN 110.

The network I/F 209 connects the control unit 200 to the LAN 120. That is, the network I/F 209 connects the image forming device 100 to the LAN 120. The network I/F 209 is connected to the mobile router 121 on the LAN 120 and uses various services provided on the Internet 131.

Router

Figure 3:
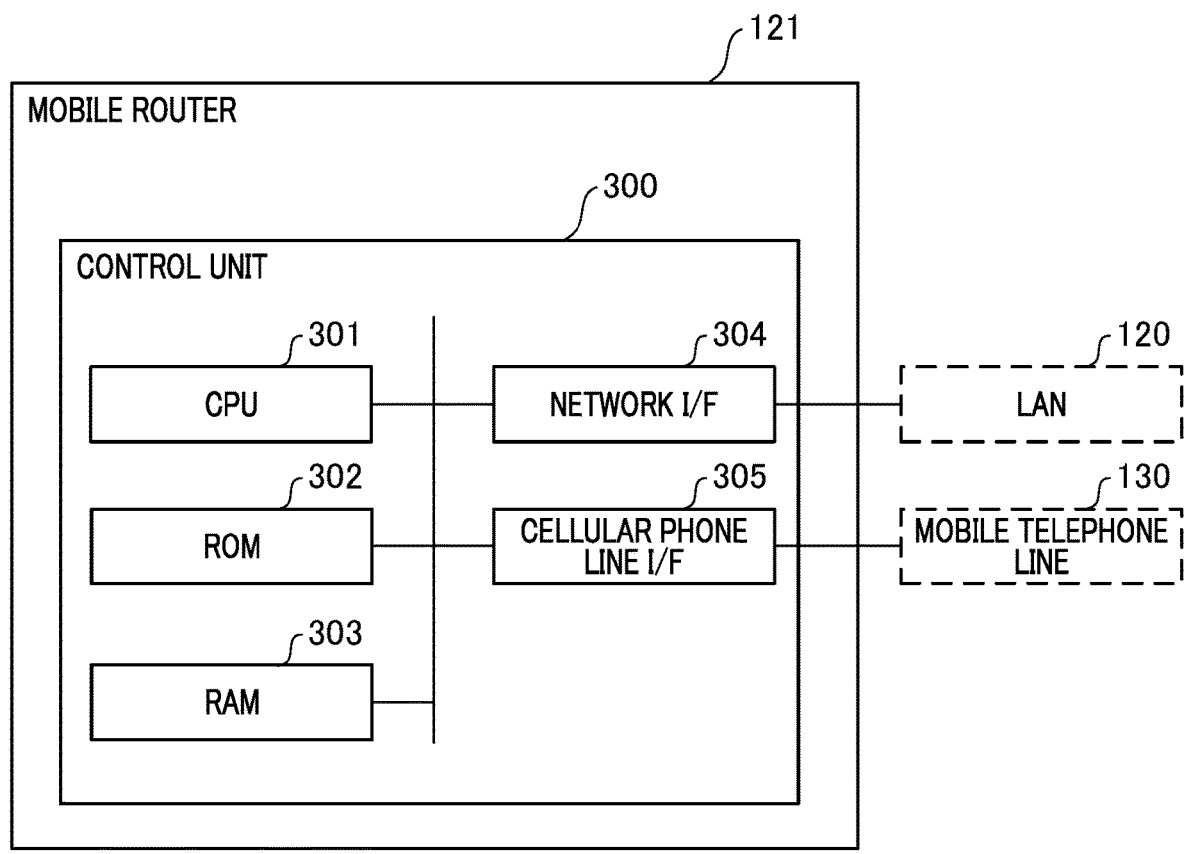
FIG. 3 is a block diagram illustrating an exemplary hardware configuration of a mobile router.

FIG. 3 is a block diagram illustrating an exemplary hardware configuration of the mobile router 121. The mobile router 121 includes a control unit 300. The control unit 300 includes a CPU 301, a ROM 302, a RAM 303, a network I/F 304, and a cellular phone line I/F 305.

The control unit 300 controls operations of the whole mobile router 121. The CPU 301 reads a control program stored in the ROM 302 and executes various control processes. The RAM 303 is used as a temporary storage area such as a main memory, a working area, and the like of the CPU 301.

The network I/F 304 is a communication I/F that has a communication function with a LAN. The cellular phone line I/F 305 is a communication I/F that has a communication function with a cellular phone line. Each I/F relays communication with the LAN and the cellular phone line in accordance with commands from the CPU 301 based on information stored in the ROM 302 and the ROM 303.

Software Configuration

Image Forming Device

Figure 4:
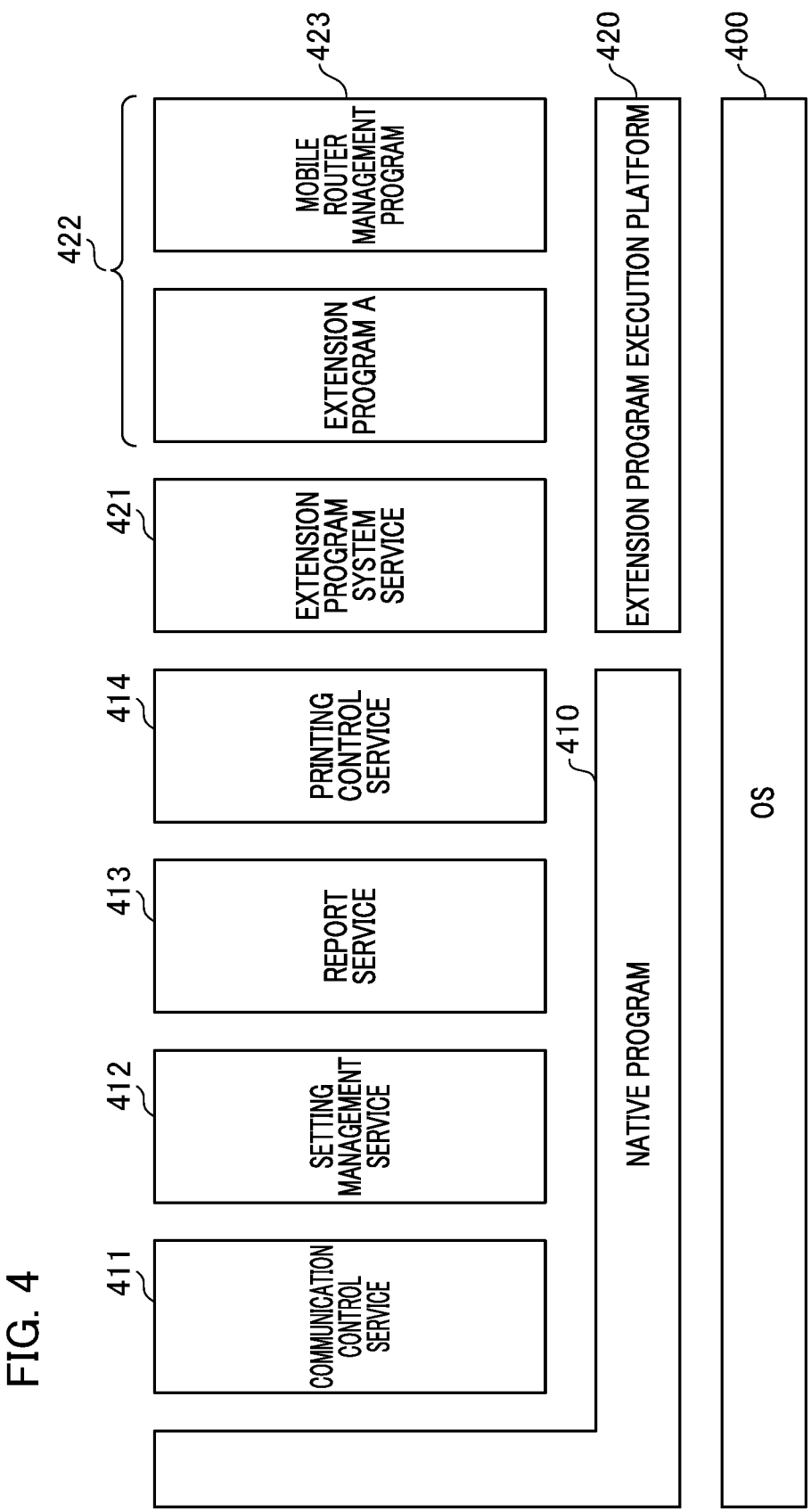
FIG. 4 is a diagram illustrating an exemplary software configuration of the image forming device.

FIG. 4 is a diagram illustrating an exemplary software configuration of the image forming device 100. The image forming device 100 has an OS 400. "OS" is an abbreviation for "operating system." The image forming device 100 includes a native program 410 and a platform 420. The image forming device 100 includes a communication control service 411, a setting management service 412, a report service 413, and a printing control service 414. The image forming device 100 includes an extension program system service 421 and an extension program 422. The image forming device 100 includes an extension program A and a mobile router management program 423.

A native program 410, which is a control program originally provided in a printer, a fax machine, a scanner, or the like, operates on the OS 400 of the image forming device 100. An extension program execution platform 420 or the like, which is a platform performing an extension program, operates on the OS 400 of the image forming device 100. The extension program execution platform 420 is a virtual machine (VM) typified by Java (registered trademark) and provides an execution environment for extension applications.

The native program 410 is an example of controller firmware which is a basic control function of the image forming device. The native program 401 is, for example, a program which is converted into a machine language which can be interpreted by the CPU 201 by compiling a program code described in C language or the like. The native program 401 is componentized for each function. A plurality of processes and threads corresponding to the components operate in tandem to realize the control function serving as the controller firmware.

In this way, the components included in the controller firmware are closely correlated with each other in many cases. Accordingly, correction or addition of the program code for a certain component unintentionally affects the other components in many cases. Accordingly, when the correction or addition is performed, a comprehensive test for checking whether the correction or addition does not affect the other components is necessary. Thus, it is generally known that the correction or addition of the native program tends to result in an increase in maintenance cost and development cost for the image forming device vendor.

The extension program execution platform 420 is an example of a product extension program that can be added in an add-on form, independently from the controller firmware. An example of a system that can be added on as a product extension program to an image forming device to expand the function of the image forming device is MEAP (registered trademark) from Canon Inc.

The communication control service 411, the setting management service 412, the report service 413, the printing control service 414, and the like operate on the native program 410. The extension program system service 421, the mobile router management program 423, and the like operate on the extension program execution platform 420.

The communication control service 411 is a service in which the image forming device 100 provides settings to perform communication of the network I/F 208 and the network I/F 209. For example, information such as IP addresses of the network I/F 208 and the network I/F 209 necessary for communication is set with the OS 400.

The setting management service 412 is a service for managing information regarding setting values in the image forming device 100. The setting management service 412 is a service for managing various kinds of setting information of network connections, a printer, a scanner, and the like. The setting management service 412 provides a function of rewriting setting information of the native program 410, for example, when a user designates a single setting or a plurality of settings or a file including a plurality of pieces of setting information. The setting management service 412 also provides a function of reading and writing setting values stored in various services on the native program 410. The setting management service 412 also has a function of providing a user interface (hereinafter referred to as UI) to the manipulation unit 210, and thus can give an instruction to change settings via the manipulation unit 210 of the image forming device 100. Further, some of the information managed by the setting management service 412 can be referenced from the extension program operating on the extension program execution platform 420.

The report service 413 is a service for providing setting information managed by the setting management service 412 as report information to a user. The report service 413 detects an event such as a user instruction from the manipulation unit 210 and outputs the setting information as report data. The report service 413 uses screen data processed by the manipulation unit 210 and image data processed by the printer 220 as an output destination of the report data. The output destination of the report data of the report service 413 is not limited thereto. For example, the output destination may be screen data of a web UI which can be manipulated on an external device such as the client computer 111. In this case, the report service 413 functions as a web application that provides a display screen (a web page) containing report data to the client computer 111 in response to an access request from the client computer 111. The report service 413 is an example of a predetermined extension application program. The image forming device 100 is an example of an image processing device in which the extension application program can be installed.

The printing control service 414 is a service for performing control such that the printer 220 prints image data received from various services on a recording medium.

The extension program system service 421 is a utility library useful for the extension programs 422 in common and is provided from the system. For example, by calling a function of the extension program system service 421 from the extension program 422, it is possible to reduce the time and effort of developing the extension program. On the other hand, the function provided by the extension program system service 421 has an operation constraint compared to an execution environment of the native program 410 in consideration of security. That is, the extension program system service 421 functions as a virtual execution environment that provides a sandbox. The extension application program that operates in a virtual execution environment may have an operation constraint such as reading and writing of information managed by the image forming device 100 being limited, compared to a program executed without involving a virtual execution environment.

The extension program 422 can access each module or each service of the image forming device 100, such as another extension program or the RAM 203, through only the extension program execution platform 420 or the extension program system service 421. That is, compared to the native program 410, in the extension program 422, access to information managed by the OS 400 or the native program or access to hardware resources is limited. Specifically, the extension program system service 421 provides an application programming interface (API) for accessing some of the setting values managed by the setting management service 412. The extension program 422 performs access to information managed by the OS 400 or the native program or access to hardware resources by calling the API. In this way, the extension program 422 accesses information managed by the native program via the API provided by the extension program system service 421. In the extension program 422, an extension program that has a UI can display an icon on a main menu screen (see FIG. 5) displayed on the manipulation unit 210 of the image forming device 100. When the manipulation unit I/F 205 detects a selection of the icon by the user through the manipulation unit 210, the manipulation unit I/F 205 transmits information indicating the detection of the selection of the icon to the CPU 201. The CPU 201 receiving this information displays a UI of the extension program selected by the user on the manipulation unit 210.

The mobile router management program 423 is a service for performing various types of management of the mobile router 121. The mobile router management program 423 performs acquisition control such that setting information is acquired from the mobile router 121 or generates report data with which setting values of the image forming device 100 read from the setting management service 412 are merged. The mobile router management program 423 uses MIB of SNMP or a unit of a web interface provided by the mobile router 121 to perform acquisition control such that information regarding the mobile router 121 is acquired. "SNMP" is an abbreviation for "simple network management protocol." "MIB" is an abbreviation for "management information base."

The software configuration illustrated in FIG. 4 is an example in which only basic portions are described. Depending on an execution environment, the image forming device 100 may have other services or the like. For reasons such as limitation of settings, the image forming device 100 may not have unnecessary services.

Figure 5:
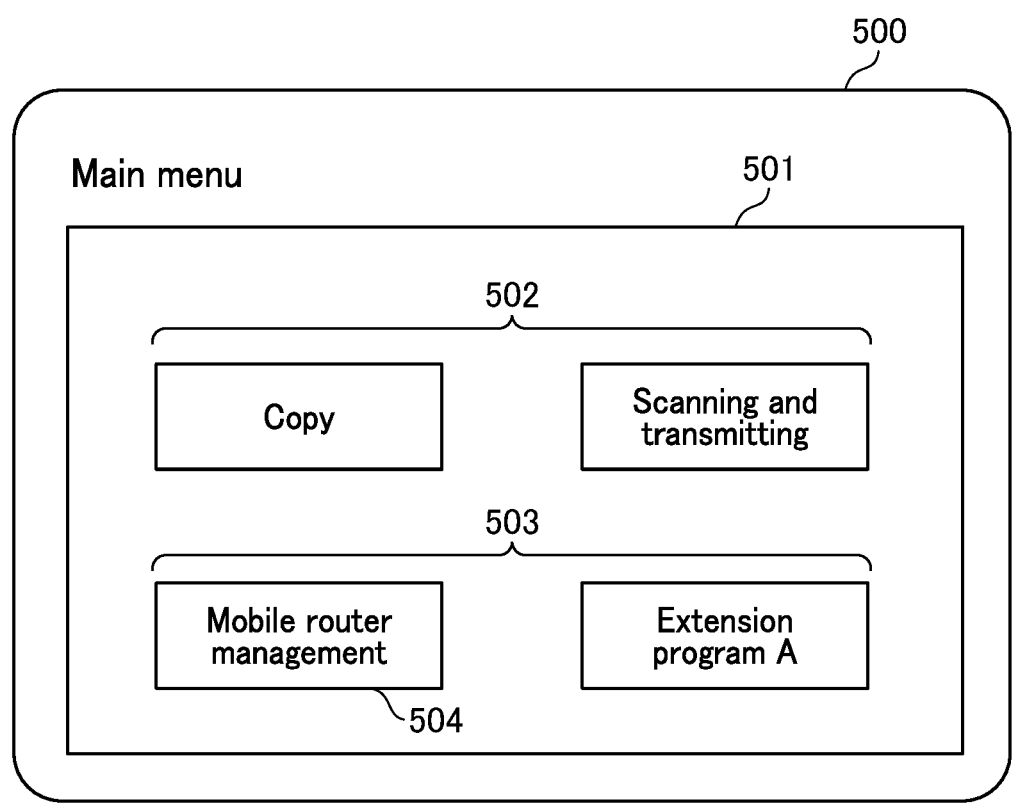
FIG. 5 is a diagram illustrating a main menu screen displayed on a manipulation unit of the image forming device.

FIG. 5 is a diagram illustrating a main menu screen displayed on the manipulation unit 219 of the image forming device 100. The main menu screen 500 has a program icon display area 501, a standard program icons 502, and an extension program icon 503.

The program icon display area 501 is an area where icons of programs which can be currently manipulated with the image forming device 100 are displayed.

The standard program icon 502 is an icon for displaying a UI used to manipulate a function of the control program of the image forming device 100.

The extension program icon 503 is an icon for displaying a UI used to manipulate the extension program of the image forming device 100. The extension program icon 503 includes a mobile router management icon 504. When a worker presses the mobile router management icon 504, a function of the mobile router management program 423 is started.

Example of Report Outputting Process Hereinafter, report outputting work of the image forming device according to the present invention will be described. When report outputting work is performed with the image forming device 100, the worker installs the mobile router management program 423 in the image forming device 100 in advance. The mobile router management program 423 may be installed in the image forming device 100 at the time of factory shipment, for example.

Further, the worker presses an icon associated with the mobile router management program 423 from the extension program icon 503 to start the report outputting process. The details of an operation of the mobile router management program 423 outputting a report will be described below with reference to FIGS. 6, 7, 8, 9, and 10.

Figure 6:
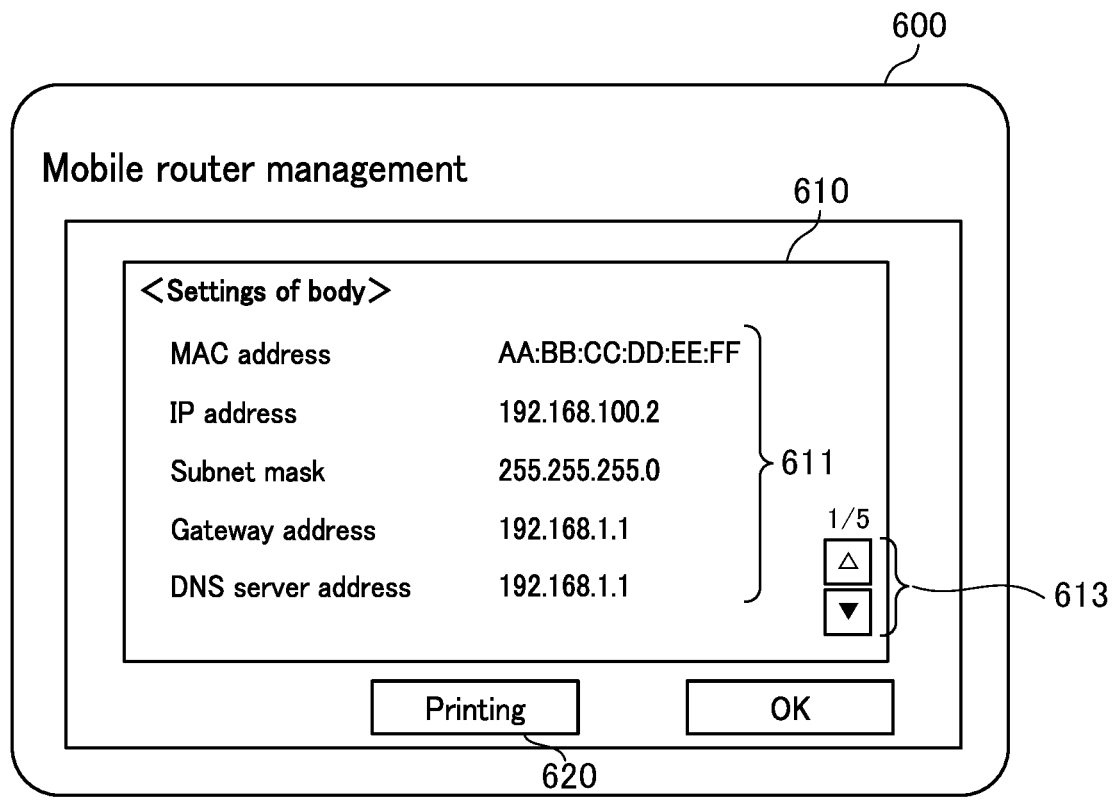
FIG. 6 is a diagram illustrating an exemplary output result of report data by a mobile router management program and a diagram illustrating setting information of the image forming device output as report data.
Figure 7:
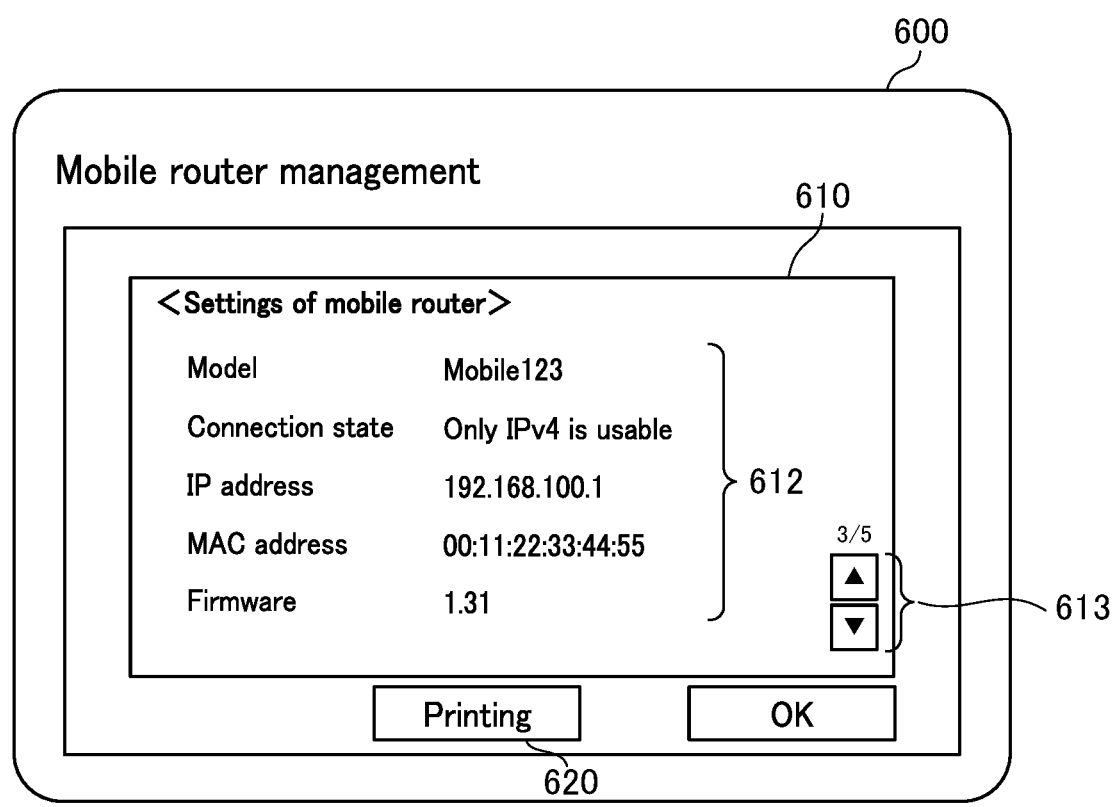
FIG. 7 is a diagram illustrating an exemplary output result of report data by the mobile router management program and a diagram illustrating setting information of the mobile router output as report data.
Figure 8:
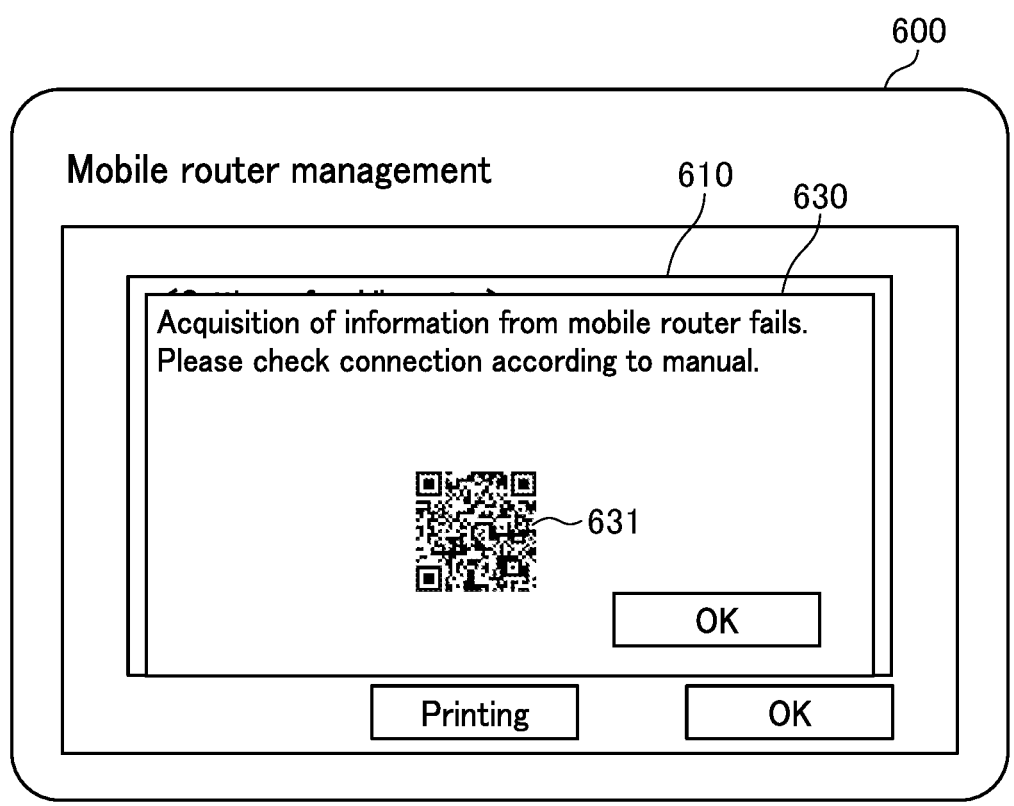
FIG. 8 is a diagram illustrating an exemplary output result of report data by the mobile router management program and a diagram illustrating an error notification when image forming device setting information and mobile router setting information cannot be obtained.

FIGS. 6, 7, and 8 are diagrams illustrating an exemplary output result of the report data by the mobile router management program 423. A mobile router management screen 600 includes a report data display area 610 and a printing instruction button 620.

The report data display area 610 is a screen where setting information of the image forming device 100 and the mobile router 121 is displayed collectively. The printing instruction button 620 is a button used for giving an instruction to output the report data displayed in the report data display area 610 to a recording medium such as a sheet.

FIG. 6 is a diagram illustrating exemplary setting information of the image forming device 100 output as report data. Image forming device setting information 611 is displayed in the report data display area 610. The image forming device setting information 611 is the setting information in the image forming device 100. The image forming device setting information 611, a list of a plurality of pieces of information necessary for network communication, such as IP addresses, is displayed.

FIG. 7 is a diagram illustrating setting information of the mobile router 121 output as report data. The report data display area 610 displays mobile router setting information 612. The mobile router setting information 612 is setting information in the mobile router 121. As the mobile router setting information 612, a plurality of pieces of information such as a firmware version of the mobile router necessary for maintenance or the like of the mobile router are collectively output in addition to information such as an IP address necessary for network communication.

In FIG. 6 and FIG. 7, a page paging button 613 is displayed in the report data display area 610. The page paging button 613 is a button for paging when the page through the image forming device setting information 611 and mobile router setting information 612 cannot be displayed on one screen but displayed on a plurality of pages. That is, the page paging button 613 is used to change a page which is displayed among a plurality of pages. For example, the mobile router management program 423 switches between the image forming device setting information 611 and the mobile router setting information 612 for display when the page paging button 613 is manipulated. When the image forming device setting information 611 and mobile router setting information 612 can be displayed on one screen, the image forming device setting information 611 and mobile router setting information 612 may be displayed on one screen. Even when the image forming device setting information 611 and the mobile router setting information 612 can be displayed on one screen, the image forming device setting information 611 and mobile router setting information 612 may be displayed on different screens.

FIG. 8 is a diagram illustrating an error notification when the image forming device setting information 611 and the mobile router setting information 612 cannot be obtained. The mobile router management program 423 displays the setting acquisition error notification area 630 overlapping on the report data display area 610 when the image forming device setting information 611 and the mobile router setting information 612 cannot be obtained.

When acquisition of the setting information fails, the failure of the setting information is notified of in the setting acquisition error notification area 630. A web manual link 631 is displayed in the setting acquisition error notification area 630. The web manual link 631 is a link to a web page on which information for investigating a cause of an error and countermeasures is provided. The mobile router management program 423 displays the web manual link 631 to prompt the user to take measures. The web manual link 631 suggests a uniform resource locator (URL) by means of, for example, a 2-dimensional bar code.

Figure 9:
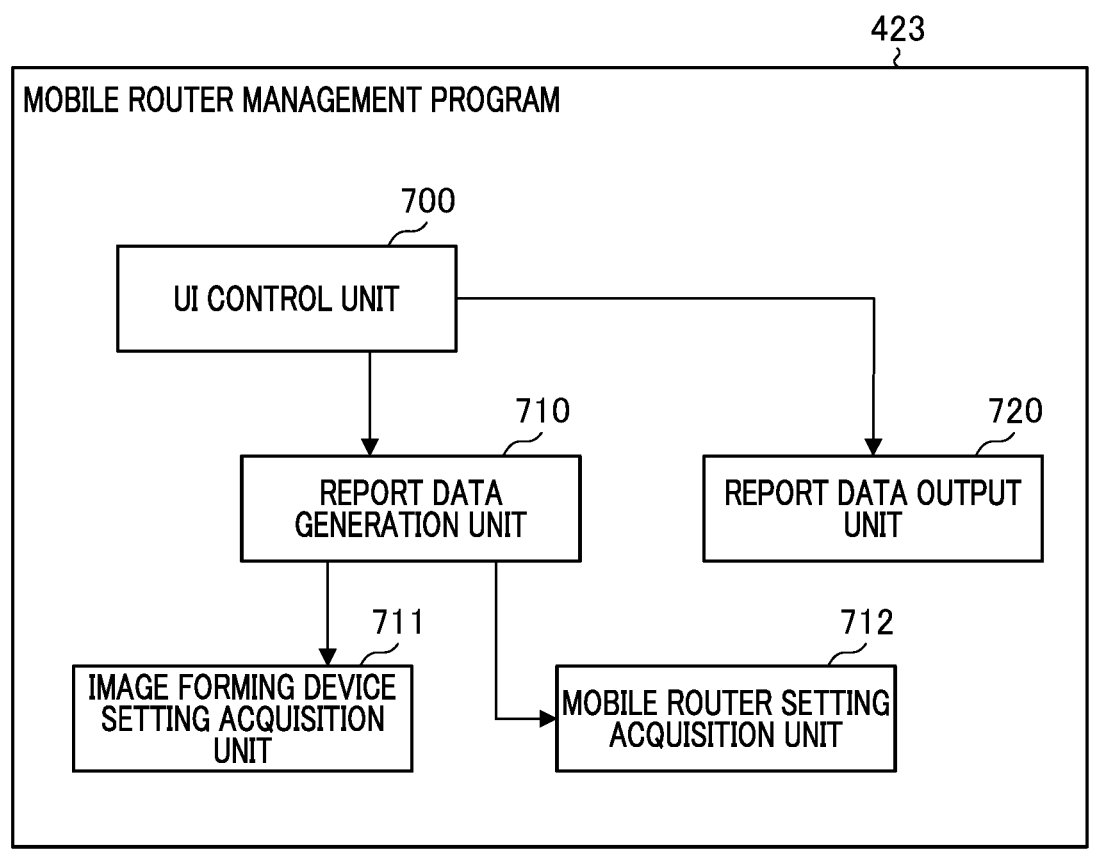
FIG. 9 is a block diagram illustrating an exemplary functional structure of the mobile router management program.

FIG. 9 is a block diagram illustrating an exemplary functional structure of the mobile router management program 423. Each function of the mobile router management program 423 illustrated in FIG. 9 is realized by causing the CPU 201 to execute a program in accordance with each function stored in the HDD 204 or the like.

A UI control unit 700 includes a report data generation unit 710 and a report data output unit 720. The UI control unit 700 provides a UI for operating the mobile router management program 423 to the worker through the manipulation unit 210 accepts a manipulation of the worker.

The report data generation unit 710 includes an image forming device setting acquisition unit 711 and a mobile router setting acquisition unit 712. The report data generation unit 710 acquires the setting information of the image forming device 100 and the mobile router 121 in response to a manipulation of the worker received by the UI control unit 700 and generates the report data.

The image forming device setting acquisition unit 711 makes a request for acquiring some of the setting values managed by the setting management service 412 by calling an API provided by the extension program system service 421. The extension program system service 421 receiving the request acquires the setting information of the image forming device 100 in cooperation with the OS or the setting management service 412 and provides a return value including the setting values to the acquisition unit 711. Here, the acquisition unit 711 is assumed to acquire network-related setting values of the image forming device 100 as the return value. The acquired information is used to output the image forming device setting information 611 as report data. The mobile router setting acquisition unit 712 access MIB or a web interface of the mobile router 121 to acquire the setting information of the mobile router 121.

The report data output unit 720 outputs the report data generated by the report data generation unit 710 to the manipulation unit 210. The manipulation unit 210 displays, for example, the mobile router management screen 600. The report data output unit 720 accesses the printing control service 414 and gives an instruction to output the report data on a recording medium such as a sheet in response to a manipulation of the worker received by the UI control unit 700.

Figure 10:
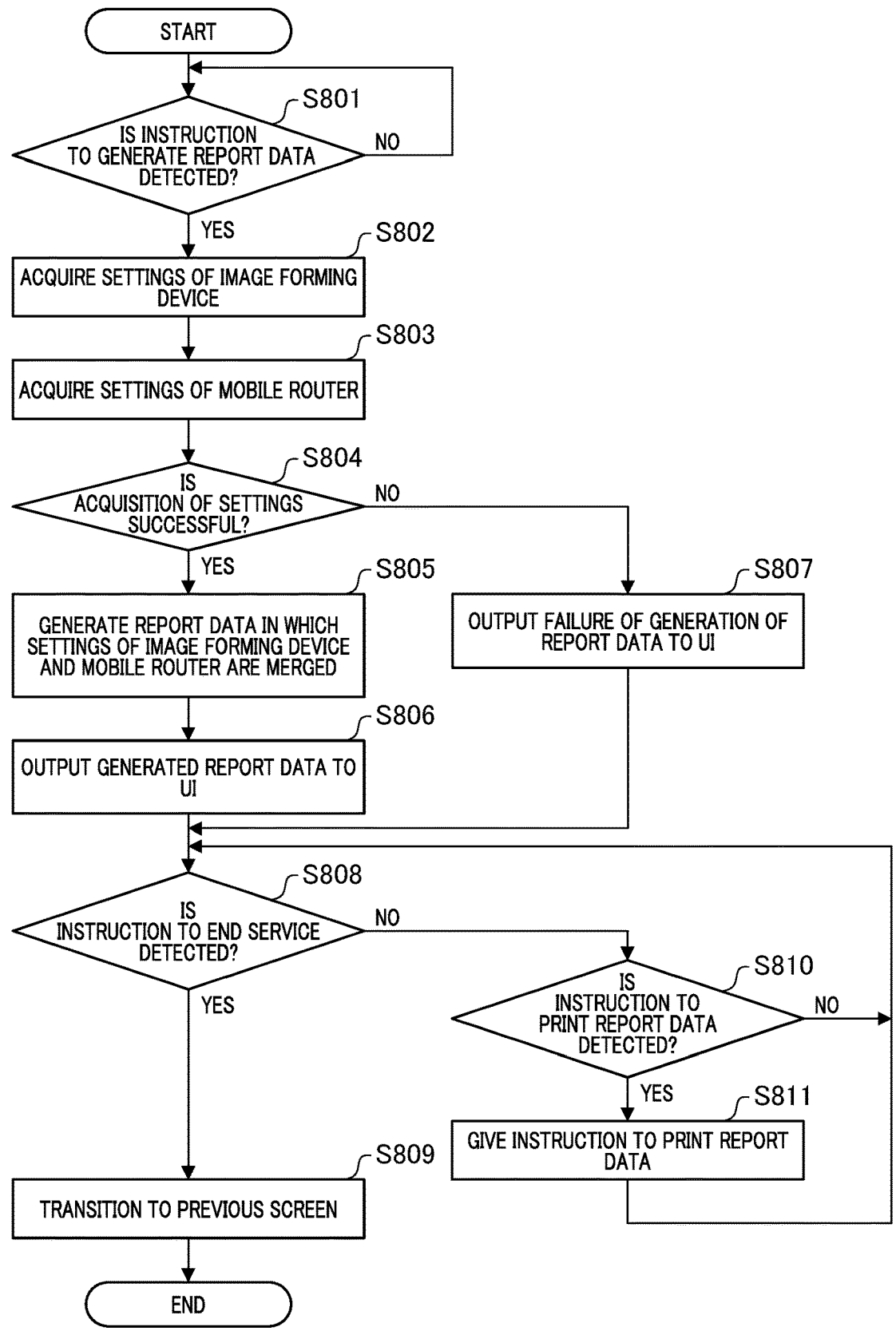
FIG. 10 is a flowchart illustrating an exemplary operation performed by the mobile router management program.

FIG. 10 is a flowchart illustrating an exemplary operation performed by the mobile router management program 423. That is, a process illustrated in this flowchart is realized by the CPU 201 executing a programs for each function stored in the HDD 204 or the like.

When the mobile router management program 423 detects that the worker presses the mobile router management icon 504, the process of the flowchart is started. In S801, the mobile router management program 423 starts a function and detects that an instruction to generate report data is given. A trigger for the above-described instruction to generate the report data is not limited thereto and another event such as an event for turning on main power of the image forming device 100 may be used as a trigger for the instruction to generate the report data.

In S802, the mobile router management program 423 accesses the setting management service 412 to acquire the setting information of the image forming device 100, that is, the own setting information. The setting information of the image forming device 100 is an example of first setting information.

Subsequently, in S803, the mobile router management program 423 access the mobile router 121 through the MIB or the web interface to acquire the setting information for the mobile router 121. The setting information of the mobile router 121 is an example of second setting information.

In S804, the mobile router management program 423 determines whether the acquisition of the setting information from both the image forming device 100 and the mobile router 121 is successful.

When the mobile router management program 423 determines in step S804 that the acquisition of the setting information from the both devices is successful, the process proceeds to S805. In S805, the mobile router management program 423 generates report data in which the setting information of the image forming device 100 and the setting information of the mobile router 121 are merged.

Subsequently, in S806, the mobile router management program 423 outputs the generated report data (see FIGS. 6 and 7) to the manipulation unit 210. The manipulation unit 210 displays the input report data.

When the mobile router management program 423 determines in S804 that the acquisition of the setting information from both the image forming device 100 and the mobile router 121 fails, the process proceeds to S807. In S807, the mobile router management program 423 outputs a message indicating that the generation of the report data fails (see FIG. 8) to the manipulation unit 210. The manipulation unit 210 displays the input message.

When the process of outputting the report data ends, in S808, the mobile router management program 423 waits for generation of an instruction to end the service. The instruction to end the service is issued by detecting whether the mobile router management screen 600 is explicitly closed by the worker, detecting firing of a timer performed in accordance with setting of lockout in the image forming device 100, or the like. The above-described trigger for the instruction to end the service is not limited thereto, and another event indicating a main power of the image forming device 100 is turned off, or the like may be set as the trigger for the instruction to end the service.

When the mobile router management program 423 detects the instruction to end the service in S808, the process proceeds to S809. In S809, the mobile router management program 423 ends the process of outputting the report data and causes the UI screen to transition to a screen displayed before the mobile router management program 423 is started. A screen to which the UI screen transitions after the mobile router management program 423 ends is not limited thereto, and the UI screen may transition to another screen.

When the mobile router management program 423 does not detect the instruction to end the service at S808, the process proceeds to S810. In S810, the mobile router management program 423 also receives an issued instruction to print the report data while waiting for instruction to end the service.

When the mobile router management program 423 detects that the printing instruction button 620 is pressed at S810, the process proceeds to S811. In S811, the mobile router management program 423 instructs the report service 413 to print and output the generated report data. When S811 ends, the mobile router management program 423 returns the process to S808. When the mobile router management program 423 does not detect in S810 that the printing instruction button 620 is pressed, the process returns to S808.

According to the above-described embodiment, the control of the mobile router 121 which is an example of a relay device can be realized through closing on the extension program, and it is possible to keep dependence on the native program 410 which is the controller firmware of the image forming device 100 which is an example of an information processing device sparsely. This sparse dependence leads to non-necessity of correction of the controller firmware of the image forming device 100 when there is a change in the relay device. That is, when a method of communicating with the relay device or a method of acquiring information is changed, it is possible to respond to the change by correcting only the extension program.

According to the present embodiment, the extension program execution platform 420 also functions as a so-called sandbox. Therefore, a comprehensive test of the image forming device 100 at the time of correction is not necessary, thereby reducing various types of cost required for correction.

Other Embodiment

The invention is also realized by performing the following processes. That is, in the above-described embodiment, the software configuration in which an instruction to output the report data is given to the report service 413 in order to print the generated report data has been described. However, the software configuration causes the dependence of the mobile router management program 423 and the report service 413. Accordingly, the mobile router management program 423 may include a unit that makes the degree of coupling with the native program 410 more sparse. For example, the mobile router management program 423 may have a software configuration in which an instruction to print the report data is executed by the printing control service 414 using a standard printing protocol with a local loopback communication. Specifically, the management program 423 generates printing data corresponding to a general printing protocol such as IPP and LPR. Subsequently, the printing data generated by setting a local loopback destination (127.0.0.1) as a destination is transmitted. The printing data is determined to be data destined for the inside in the TCP/IP protocol stack (not illustrated) of the OS 400. The printing data that is determined to be the data destined for the inside is transmitted to a printing service which is response for a printing process of processing the printing data in conformity with IPP or LPR. The printing service is realized by executing the native program. The printing service that receives the printing data performs the above-described printing process in cooperation with the printer 220. This allows for further loosely coupling between the information processing device and the relay device.

In an operation of the image forming device 100, counter information regarding the number of printed sheets used for the settlement of management cost may be managed separately in a printing instruction of the related art and an instruction to print the report data. For example, in a software configuration in which the mobile router management program 423 performs report printing in conformity with a standard printing protocol, a counter that manages printing of the related art is not used in printing of the report data by the mobile router management program 423. For example, in a software configuration in which the mobile router management program 423 performs printing of the report data in conformity with a standard printing protocol, the number of printed sheets is recorded in a counter that manages printing of the report data.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. The scope of the following claims is to be accorded the broadest interpretation so as to encompass all such modifications and equivalent structures and functions.

This application claims the benefit of Japanese Patent Application No. 2021-122336, filed Jul. 27, 2021, which is hereby incorporated by reference wherein in its entirety.

What is claimed is:

1. An information processing device comprising at least one processor or circuit configured to function as:
   a first acquisition control unit configured to acquire first setting information which is setting information of the information processing device;
   a communication unit configured to communicate with a relay device via a network;

a second acquisition control unit configured to acquire, via the network, second setting information which is setting information of the relay device;

a generation unit configured to generate report data by merging the first setting information and the second setting information; and an output unit configured to output the report data, wherein the information processing device is an image processing device configured so that an extension application program is able to be installed, the image processing device provides a virtual execution environment in which the installed extension application program is executed, and the extension application program executed in the virtual execution environment has an operation constraint that access to information managed by the information processing device is limited compared to a program executed without involving the virtual execution environment, wherein a predetermined extension application program installed in the image processing device is executed in the virtual execution environment to realize the first acquisition control unit, the second acquisition control unit, and the generation unit, and wherein the first acquisition control unit realized by the predetermined extension application program executed in the virtual execution environment acquires the first setting information managed by the program executed without involving the virtual execution environment by calling an API that accesses setting information of the information processing device.

2. The information processing device according to claim 1, further comprising a display unit,
wherein the output unit displays the report data on the display unit.

3. The information processing device according to claim 1, further comprising a printing unit,
wherein the output unit outputs the report data by causing the printing unit to print an image corresponding to the report data.

4. The information processing device according to claim 3, wherein the output unit transmits printing data for printing the report data by local loopback, and when the printing data is received by the information processing unit, a printing image indicating the report data generated based on the received printing data is output by being printed on a sheet by the printing unit.

5. The information processing device according to claim 3, further comprising a booking unit configured to book a printing number in a counter that manages printing of the report data when the printing unit prints the report data.

6. The information processing device according to claim 1, further comprising a notifying unit configured to notify of an acquisition failure of the first or second setting information.

7. A method of controlling an information processing device, the method comprising:
acquiring first setting information which is setting information of the information processing device;
communicating with a relay device via a network;
acquiring, via the network, second setting information which is setting information of the relay device;
generating report data by merging the first setting information and the second setting information; and
outputting the report data,
wherein the information processing device is an image processing device configured so that an extension application program is able to be installed, the image processing device provides a virtual execution environment in which the installed extension application program is executed, and the extension application program executed in the virtual execution environment has an operation constraint that access to information managed by the information processing device is limited compared to a program executed without involving the virtual execution environment,
wherein a predetermined extension application program installed in the image processing device is executed in the virtual execution environment to acquire the first setting information, to acquire, via the network, the second setting information, and to generate the report data, and
wherein the first setting information managed by the program executed without involving the virtual execution environment is acquired by calling an API that accesses setting information of the information processing device.

8. A non-transitory storage medium on which is stored a computer program related to an information processing method, which performs control by an application operating in an information processing device, the method comprising:
acquiring first setting information which is setting information of the information processing device;
communicating with a relay device via a network;
acquiring, via the network, second setting information which is setting information of the relay device;
generating report data by merging the first setting information and the second setting information; and
outputting the report data,
wherein the information processing device is an image processing device configured so that an extension application program is able to be installed, the image processing device provides a virtual execution environment in which the installed extension application program is executed, and the extension application program executed in the virtual execution environment has an operation constraint that access to information managed by the information processing device is limited compared to a program executed without involving the virtual execution environment,
wherein a predetermined extension application program installed in the image processing device is executed in the virtual execution environment to acquire the first setting information, to acquire, via the network, the second setting information, and to generate the report data, and
wherein the first setting information managed by the program executed without involving the virtual execution environment is acquired by calling an API that accesses setting information of the information processing device.

* * * * *